United States Patent Office 3,214,472
Patented Oct. 26, 1965

3,214,472
N-(SUBSTITUTED-PHENYL)-2,4-DIHYDROXY-
ANILINES
Roger Charle, Soisy-sous-Montmorency, Seine-et-Oise,
and Robert Lantz, Paris, France, assignors to Societe
Anonyme dite: L'Oreal, a corporation of France
No Drawing. Filed Aug. 29, 1962, Ser. No. 220,137
10 Claims. (Cl. 260—571)

The present application is a continuation-in-part of prior application Serial Number 2,817, filed January 18, 1960, now abandoned.

The present invention relates to a new article of manufacture consisting of a composition which may be used as a coloring agent, and particularly for dyeing living human hair. This composition has the following formula:

(A)
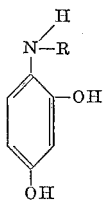

In this formula, R indicates a monovalent alkyl, aryl, alkylaryl or cyclo-alkyl group, which may be substituted, especially by hydroxyl, alkoxy, amino, alkylamino and dialkylamino groups.

The invention also relates to a process for preparing compositions corresponding to the Formula A and their salts which process is characterized by mixing trihydroxy-1,2,4-benzene and a primary amine R—$NH_2$, in an aqueous medium, protected from the air, and then isolating in a known manner either the reaction product or a salt formed from this product when acted upon by an inorganic acid. (In the formula R—$NH_2$, R has the same significance as in Formula A.)

In a preferred method of carrying out the process of preparing the composition, the reaction is carried out at a temperature below 100° C., and preferably between 10° C. and 40° C. When working at the ordinary temperature of 20° C., the process is completed after a delay which may vary from 1 to 12 days. It is naturally quicker at higher temperatures. The pH of the reaction solution should be between 7 and 12; it may be necessary, in certain cases, to keep the solution within this pH zone by adding an alkalizing agent such as sodium carbonate.

When the product formed is not very soluble in the reaction mixture, it may be separated by simple filtration. It may also be extracted by means of a solvent. Alternatively, it may be transformed into a salt, for example by adding an acid to the mixture, and the salt then separated out in a conventional manner.

Several specific examples will now be given of methods of carrying out the process of preparing compositions according to the invention, together with several examples showing the use of these compositions. It will of course be understood that the invention may also be carried out in other ways.

In all the examples the proportions are given by weight.

Example 1

A solution of 12.5 parts of trihydroxy-1,2,4-benzene and 5.3 parts of monomethylamine in 500 parts of water is kept protected from the air for 6 days at ordinary room temperature, 537 parts of hydrochloric acid at 22° Bé. are then added. The mixture is evaporated until dry under a vacuum and the residue recrystallized after having been dissolved in a mixture of 13.4 parts of hydrochloric acid at 22° Bé. and 7.5 parts of water. The chlorohydrate of dihydroxy-2,4-methylaminobenzene is thus obtained.

Example 2

A mixture of 6.25 parts of trihydroxy-1,2,4-benzene, 9.85 parts of cyclohexylamine, and 3.33 parts of acetic acid diluted to 250 parts with water is kept for 5 days protected from the air. Crystals are formed which are dried without heating and then dissolved by heating them in 109 parts of a mixture of equal volumes of hydrochloric acid at 22° Bé. and water. The chlorhydrate of dihydroxy-2,4-cyclohexylaminobenzene crystallizes out on cooling. It may be recrystallized in a mixture of hydrochloric acid and water identical to that previously employed. The triacetylated derivative of dihydroxy-2,4-cyclohexylaminobenzene melts at 117° C. If the cyclohexylamine is replaced by 8.75 parts of amino-n-pentane, crystals of dihydroxy-2,4-n-pentylaminobenzene are obtained. After filtration, these crystals may be transformed into the chlorhydrate by dissolving them by heating them with 35.8 parts of hydrochloric acid at 22° Bé. The chlorhydrate crystals which form during the cooling of the solution are then separated out by filtration.

Example 3

A mixture of 12.5 parts of trihydroxy-1,2,4-benzene, 18 parts of aniline, 4.4 parts of sodium carbonate and a sufficient quantity of water to total a volume of 500 parts is kept protected from the air at ordinary room temperature for five days. The crystals obtained are dried without heating while protected from the air.

These crystals are dissolved by heating them in a mixture of 35.8 parts of hydrochloric acid at 22° Bé. and 60 parts of water.

The chlorhydrate of dihydroxy-2,4-phenylaminobenzene is crystallized out by cooling, and purified by recrystallization in a mixture containing the same proportions of hydrochloric acid and water.

The triacetylated derivative of dihydroxy-2,4-phenylaminobenzene thus obtained melts at 122–123° C.

Dihydroxy-2,4-phenylaminobenzene may be obtained in basic form by vacuum drying the first crystals obtained before treating them with hydrochloric acid, and dissolving them in 210 parts of benzene, which is then evaporated. The residue is then dissolved in 176 parts of benzene and again precipitated by adding heptane. The crystals obtained after recrystallization in heptane are dihydroxy-2,4-phenylaminobenzene and melt at 85.5–86° C.

Example 4

A solution of 12.5 parts of trihydroxy-1,2,4-benzene, 24.5 parts of orthoanisidine, 4.4 parts of sodium carbonate, 99 parts of alcohol, and a quantity of water sufficient to produce a total volume of 500 parts, is kept protected from the air for 10 days. This is concentrated, under a vacuum, to 30–40 parts; 60 parts of water and 71.5 parts of hydrochloric acid at 22° Bé. are then added. The mixture is evaporated until dry and 70 parts of water are then added. The precipitate is then dried without heating it and washed with water. It consists of the chlorhydrate of dihydroxy-2,4-methoxy-2′ diphenylamine.

The triacetylated derivative of the base belts at 127–128° C.

Example 5

A mixture of 62.5 parts of 1,2,4-trihydroxybenzene, 5.3 parts of paratoluidine, 2.2 parts of sodium carbonate, and 59.5 parts of alcohol is diluted with water to a total of 500 parts and kept protected from the air for eight days. An excess of hydrochloric acid at 22° Bè (about 35.8 parts) is then added to obtain an acid reaction when tested with Congo red paper. The solution is then evaporated until dry, under a vacuum, and the residue dissolved in absolute ethanol. The alcoholic solution obtained is evaporated until dry, leaving a residue of chlorhydrate of dihydroxy-2,4-methyl-4' diphenylamine which is purified by crystallizing it in a mixture of equal volumes of water and hydrochloric acid at 22° Bè.

The resulting triacetylated derivative melts at 109–110° C.

If the paratoluidine in the preceding preparation is replaced by its ortho isomer, the chlorhydrate of dihydroxy-2,4-methyl-2' diphenylamine is produced. The triacetylated derivative of this base melts at 150–151° C.

The chlorhydrate of dihydroxy-2,4-methyl-3' diphenylamine may be obtained in the same manner by using metatoluidine. The triacetylated derivative melts at 85° C. By replacing the paratoluidine with 6.25 parts of paraanisidine the chlorhydrate of dihydroxy-2,4-methoxy-4' diphenylamine may be obtained. The triacetylated derivative of the base of the latter composition melts at 130–131° C.

*Example 6*

A mixture of 11 parts of trihydroxy-1,2,4-benzene, 10 parts of hydroxy-4-aminobenzene, 4.5 parts of sodium carbonate, and sufficient water to make a total of 1000 parts is agitated while protected from the air, at ordinary temperature for four days. The mixture is filtered and the filtrate acidified. It is then evaporated under a vacuum until dry, and 100 parts of water and 14.4 parts of anhydrous sodium acetate are added. It is then extracted 4 successive times with ether, and a mixture of 88.5 parts of hydrochloric acid at 22° Bè. and 50 parts of water is added to the etherized solution, which is then evaporated until dry while protected from the air. The chlorhydrate of trihydroxy-2,4,4'-diphenylamine thus obtained is highly soluble in water.

*Example 7*

The hydroxy-4-aminobenzene in the preceding preparation is replaced by an equal weight of hydroxy-2-aminobenzene and by operating in the same manner the chlorhydrate of trihydroxy-2,4,2'-diphenylamine is obtained.

*Example 8*

A mixture of 12.5 parts of trihydroxy-1,2,4-benzene, 13.5 parts of dimethylamino-4-aminobenzene, 4.4 parts of sodium carbonate and a quantity of water sufficient to bring to a total of 500 parts is kept for 5 days at ordinary temperatures and protected from the air. The crystals obtained are dried without heating them, while protected from the air and rinsed with a very little water. They consist of dihydroxy-2,4-dimethylamino-4'-diphenylamine.

The invention permits hair and fur to be dyed by use of such products. The dyeing may be carried out in several different ways, in which the fibers to be dyed are impregnated with an aqueous composition according to Formula A and the composition is oxidized while still on the fibers.

*Example 9*

There is prepared a solution of:

1,2,4-trihydroxybenzene _____ g__ 12.6
N-monoacetyl-p-phenylenediamine _____ g__ 15
2 N aqueous NaOH _____ cc__ 15
Water, q.s. #200 cc.

The solution is heated at 80° C. for 6 hours under a nitrogen atmosphere. After cooling, the mixture is acidified with 20 cc. of glacial acetic acid and extracted with diethyl ether. The ethereal extracts are treated with hydrochloric acid (22° Bè.) to which its own volume of water has been added. This solution deposits after 10 hours, a crystalline product which is removed by means of a centrifuge. It is 2,4-dihydroxy-4'-amino- diphenylamine hydrochloride and is obtained in a yield of 3.11 g.

*Elementary analysis.*—Calculated for $C_6H_3(OH)_2NH—C_6H_4NH_2, HCl$:

|  | Calculated | Found | | |
| --- | --- | --- | --- | --- |
| C, percent | 57 | 56.13 | 56.38 | 56.12 |
| H, percent | 5.1 | 5.15 | 5.26 | |
| N, percent | 11.1 | 11.6 | | |
| Cl, percent | 14 | 12.28 | 12.76 | 12.16 |

*Example 10*

The following mixture is kept for 5 days at 37° C. under a nitrogen atmosphere:

1,2,4-trihydroxybenzene _____ g__ 12.6
N,N'-diethyldiaminoethylene _____ g__ 11.6
Water, q.s. #200 cc.

There are then added 50 cc. of HCl (22° Bé.), and the solution is then evaporated under a reduced nitrogen pressure. There remains a tarry mass which is washed at elevated temperature with 50 cc. of absolute ethyl alcohol.

There is thus obtained 2,4-dihydroxy-1-diethylaminoethylamino-benzene dihydrochloride in a yield of about 5 g.

This hydrochloride is recrystallized from hydrochloric acid and then dried over $P_2O_5$ at 100° C. in vacuo to constant weight.

*Elementary analysis.*—Calculated for $C_6H_3(OH)_2NH—CH_2N(C_2H_5)_2, 2HCl$:

|  | Calculated | Found | |
| --- | --- | --- | --- |
| C, percent | 48.5 | 48.25 | 48.27 |
| H, percent | 7.4 | 7.24 | 7.40 |
| N, percent | 9.42 | 9.10 | 9.35 |

*Example 11*

White hair is impregnated with an aqueous solution containing 3% of chlorhydrate of dihydroxy-2-4-diphenylamine. After 20 minutes it is rinsed, dried without heat, and impregnated with an aqueous solution containing 3% ammonia gas. The hair, thus impregnated, is left in contact with the air for twenty minutes, shampooed, and rinsed. It is then colored a light auburn with glints of gold.

If in the preceding process, the ammonia solution is replaced by an aqueous solution containing 1% of sodium carbonate, the hair is still dyed a light auburn shade with glints of gold, substantially as before.

By proceeding as set forth in the first paragraph of the present example, but replacing the chlorhydrate of dihydroxydiphenylamine with an equal quantity of chlorhydrate of dihydroxy-2,4-methyl-3'-diphenylamine or dihydroxy-2,4-methyl-4'-diphenylamine, the shades produced are similar. On the other hand, by proceeding as set forth in this first paragraph but using the chlorhydrates of dihydroxy-2,4-methoxy - 4' - diphenylamine, of trihydroxy - 2,4,4' - diphenylamine, of trihydroxy - 2,4,2' - diphenylamine, or of cyclohexylamino-1 - dihydroxy - 2,4,-benzene the hair is colored chestnut brown, dark ash blond, and auburn with reddish glints, respectively.

*Example 12*

White hair is immersed for 20 minutes in an aqueous solution containing 1% of chlorhydrate of dihydroxy-2,4-methylamino benzene and about 0.4% of sodium carbonate so as to obtain a pH of 6.5. The hair is then exposed to the air for 20 minutes, rinsed and shampooed. It is dyed an auburn shade with reddish glints.

By proceeding in the same manner, but with a solution containing 3% of chlorhydrate of trihydroxy-2,4,4'- diphenylamine and 1.2% of sodium carbonate, the hair is dyed a golden chestnut shade. A similar shade is obtained by replacing the sodium carbonate with 0.8% of ammonia gas.

Analogous shades may be obtained by replacing the aforementioned chlorhydrate with the same quantity of chlorhydrate of dihydroxy-2,4-methoxy-4'-diphenylamine.

If the hair is impregnated by means of a brush, instead of soaking in the solution, as suggested above, and the hair is then exposed to the air for about 30 minutes, similar, but slightly weaker shades are obtained.

Similar but less long lasting shades may be obtained by replacing the ammonia or the sodium carbonate, with 4% of ammonium sesquicarbonate or 2.3% of ammonium carbonate.

*Example 13*

White hair is impregnated with a solution containing 3% chlorhydrate of dihydroxy-2,4-diphenylamine. After 30 minutes it is rinsed, shampooed, dried without heating, and then impregnated with a solution containing 5% diethylamine. After having been left in contact with the air for 10 minutes it is dried at 40° C. without rinsing. The hair is colored a light reddish chestnut or auburn.

If the same process is carried out, but with the chlorhydrate of dihydroxy-2,4-diphenylamine replaced by an equal quantity of chlorhydrate of dihydroxy-2,4-methyl-3'-diphenylamine or of dihydroxy-2,4-methyl-4'-diphenylamine a similar shade is obtained. If the chlorhydrate of trihydroxy-2,4,4' - diphenylamine, of dihydroxy - 2,4-methoxy-4'-diphenylamine or of cyclohexylamino-1-dihydroxy-2,4-benzene is used instead, the hair will be dyed a deep golden blond, chestnut with a mahogany glint and deep ash blond, respectively.

*Example 14*

The white hair is impregnated with an aqueous solution containing 3% of chlorhydrate of dihydroxy-2,4-diphenylamine. After 20 minutes, it is rinsed, dried without heating, and impregnated with an aqueous solution containing two parts of sodium iodate and 2 parts of acetic acid per 100 parts. After 20 minutes, it is rinsed, and shampooed. It is dyed a pale auburn or chestnut. Similar, but weaker shades are obtained by replacing the sodium iodate solution with an aqueous solution containing 4 parts of potassium persulfate, 2 parts of acetic acid, and 1.5 parts of anhydrous sodium acetate per 100 parts of solution. The oxidation may also be accomplished by means of a solution containing 1.5 parts of sodium perborate and 2 parts of sodium carbonate per 100 parts of solution.

If the same process using sodium iodate is carried out, except for replacement of the chlorhydrate of 2,4-dihydroxydiphenylamine solution with a solution containing the same quantity of chlorhydrate of dihydroxy-2,4-methyl-4'-diphenylamine or of trihydroxy-2,4,4'-diphenylamine, or of dihydroxy-2,4-methoxy-4'-diphenylamine, or of trihydroxy-2,4,2'-diphenylamine or of cyclohexylamino-1-dihydroxy-2,4-benzene, the hair is dyed an ash blond shade, auburn with violine glints, light auburn, auburn with greenish yellow glints, and grayish auburn, respectively.

The shades obtained remain substantially the same if the rinsing step preceding the impregnation with the oxidizing solution is omitted.

*Example 15*

A rabbit pelt mordanted with copper is immersed in an aqueous solution kept at a temperature of 35° C. and containing 2 parts of chlorhydrate of trihydroxy-2,4,4'-diphenylamine per 1000 parts of solution. After a half-hour 12 parts of hydrogen peroxide per 30 volumes are added, and after three more hours, the pelt is rinsed. It is dyed a reddish brown.

When a pelt mordanted with iron is dyed in the same way a violet brown shade is obtained.

By using the chlorhydrate of dihydroxy-2,4-diphenylamine instead of the last mentioned chlorhydrate, on an unmordanted pelt, a grey shade is obtained; on a pelt mordanted with copper a blackish brown shade, and on a pelt mordanted with chromium a deep yellowish brown shade.

By operating as outlined in the first paragraph of the present example, but by adding 10 parts of 2% strength ammonia immediately after the addition of hydrogen peroxide, a similar but more reddish shade is obtained.

*Example 16*

White hair is impregnated with an aqueous solution containing 3% of the hydrochloride of N-amino-4'-dihydroxy-2,4-diphenylamine and 4% of ammonium sesquicarbonate. After contact for 20 minutes, it is rinsed, lightly shampooed, rinsed again and dried. The white hair is dyed a light chestnut shade.

*Example 17*

Under the same conditions as in Example 16, using a 3% solution of 4-(diethylaminoethyl)aminoresorcinol and 4% of ammonium sesquicarbonate, a dark chestnut shade is obtained.

As shown in Examples 11 to 17, the process may be carried out in one step or in two steps, that is to say, either by impregnating the hair (or other keratinous fibers) with the solution containing both the oxidation dye and an oxidizing agent, or by first impregnating the hair with a solution containing only the oxidation dye, and then, possibly after rinsing the hair bringiing about oxidation of the dye. This oxidation may be accomplished by the action of only the oxygen in the ambient air.

Among the oxidizing agents which may be used are: hydrogen peroxide, whether combined with urea or not, a hypochlorite, a chlorite, a chlorate, a bromate, an iodate, a sulfamide derivative having a chlorine atom substituted on the nitrogen, a persulfate or a perborate.

When the oxidation is produced by the ambient air, it is often advantageous to rinse the fibers in water or wash them with a solution having a pH higher than that of the oxidation dye solution. In order to dye hair, an ammonia solution may be used, or an ammonium carbonate solution, or a solution of a volatile amine, such as diethylamine. Since these products evaporate, the step of rinsing the hair may be eliminated.

The dyeing process which utilizes products conforming to the invention permits furs and hair to be dyed in shades of brown, auburn or chestnut, gray and black which are very natural and well liked for that reason. The possibility of dyeing living hair by simply exposing to the air hair which has been impregnated with the oxidation dye greatly simplifies the dyeing process.

It will be appreciated that the invention comprises the use of dyeing compositions according to the invention, comprising one or more oxidation dyes according to Formula A together with additional dyes or colorants heretofore known, as well as conventional auxiliary agents heretofore used, such, for example, as thickening agents, wetting agents, penetrating agents, solvents, reducing agents, and oxidation catalysts.

What is claimed is:
1. A chemical compound having the formula

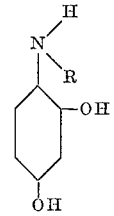

wherein R is a monovalent radical selected from the group consisting of hydroxyphenyl, aminophenyl and dimethylaminophenyl.

2. 2,4,4'-trihydroxy-diphenylamine.
3. 2,4,2'-trihydroxy-diphenylamine.
4. 2,4-dihydroxy-4'-amino-diphenylamine.
5. 2,4-dihydroxy-1-diethylaminobenzene.
6. 2,4-dihydroxy-4'-dimethylamino-diphenylamine.
7. The method of preparing a chemical compound having the formula

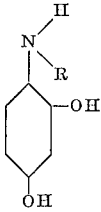

wherein R is a monovalent radical selected from the group consisting of hydroxyphenyl, aminophenyl, and dimethylaminophenyl, comprising the steps of mixing trihydroxy-1,2,4-benzene and a primary amine $RNH_2$ in an aqueous medium at a temperature below 100° C. at atmospheric pressure, protecting the resulting mixture from the air while permitting its components to react together and separating the reaction products.

8. The process as claimed in claim 7 in which the mixture is kept protected from the air from one to twelve days.

9. The process as claimed in claim 7 in which the pH of the mixture in solution is adjusted to a value of at least 7 but no higher than 12.

10. The process as claimed in claim 7 which is carried out at a temperature between 10° C. and 40° C.

References Cited by the Examiner

UNITED STATES PATENTS

| 2,666,791 | 1/54 | Weinmayr | 260—571 |
| 2,843,468 | 7/58 | Thompson et al. | 260—577 X |

FOREIGN PATENTS

| 745,532 | 2/56 | Great Britain. |

CHARLES B. PARKER, *Primary Examiner.*